(12) United States Patent
Baranowski et al.

(10) Patent No.: US 11,827,281 B2
(45) Date of Patent: Nov. 28, 2023

(54) CONNECTING ELEMENT AND METHOD FOR PRODUCING A STRUCTURAL CONNECTION BETWEEN TWO STRUCTURAL PARTS BY FOAMABLE MATERIAL, AND ASSEMBLY COMPOSED OF TWO STRUCTURAL PARTS CONNECTED WITH A CONNECTING ELEMENT

(71) Applicant: Ford Global Technologies, LLC, Dearborn, MI (US)

(72) Inventors: Thomas Baranowski, Würselen (DE); Maik Broda, Würselen (DE); Pascal Rebmann, Weilerswist (DE); Markus Franzen, Stolberg (DE)

(73) Assignee: Ford Global Technologies, LLC, Dearborn, MI (US)

(*) Notice: Subject to any disclaimer, the term of this patent is extended or adjusted under 35 U.S.C. 154(b) by 239 days.

(21) Appl. No.: 17/317,931

(22) Filed: May 12, 2021

(65) Prior Publication Data
US 2021/0354764 A1 Nov. 18, 2021

(30) Foreign Application Priority Data
May 13, 2020 (DE) .......................... 102020206061.4

(51) Int. Cl.
*B29C 44/18* (2006.01)
*B29C 44/34* (2006.01)
(Continued)

(52) U.S. Cl.
CPC .......... *B62D 27/026* (2013.01); *B29C 44/183* (2013.01); *B29C 44/185* (2013.01);
(Continued)

(58) Field of Classification Search
CPC ..... B29C 44/02; B29C 44/12; B29C 44/1228; B29C 44/128; B29C 44/18; B29C 44/182;
(Continued)

(56) References Cited

U.S. PATENT DOCUMENTS 7,520,560 B2 4/2009 Frank et al.

FOREIGN PATENT DOCUMENTS

DE 3826011 A1 * 2/1990
DE 4039135 A1 * 6/1992
(Continued)

*Primary Examiner* — Michael A Tolin
(74) *Attorney, Agent, or Firm* — Burris Law, PLLC

(57) ABSTRACT

A connecting element for producing a structural connection between a first structural part and a second structural part by a foamable material, the connecting element includes a plug-in part and at least two chambers separated from one another in a fluid-tight manner by a partition, the at least two chambers each accommodating a reactant; a plug-in delimiting part mechanically connected to the plug-in part and configured to delimit displacement of the plug-in part in the plug-in direction; and a break-open mechanism configured to damage the partition, as a result of a break-open force supplied to the break-open mechanism, such that the fluid-tight manner between the at least two chambers is canceled, wherein reactants are selected such that mixing thereof causes a foaming reaction, which extends radially outward beyond the circumferential surface of the plug-in part.

19 Claims, 5 Drawing Sheets

(51) Int. Cl.
  *B29C 65/48*   (2006.01)
  *B62D 65/02*   (2006.01)
  *B62D 27/02*   (2006.01)
  *B62D 25/04*   (2006.01)
  *B62D 25/06*   (2006.01)

(52) U.S. Cl.
  CPC .......... *B29C 44/353* (2013.01); *B29C 65/485* (2013.01); *B62D 65/02* (2013.01); *B62D 25/04* (2013.01); *B62D 25/06* (2013.01)

(58) Field of Classification Search
  CPC ... B29C 44/183; B29C 44/184; B29C 44/185; B29C 44/188; B29C 44/34; B29C 44/35; B29C 44/351; B29C 44/353; B29C 65/485; B62D 25/04; B62D 25/06; B62D 27/023; B62D 27/026; B62D 65/02; F16B 11/006
  See application file for complete search history.

(56) References Cited

FOREIGN PATENT DOCUMENTS

| | | |
|---|---|---|
| DE | 102011120518 | 6/2013 |
| DE | 102016203402 | 9/2017 |

\* cited by examiner

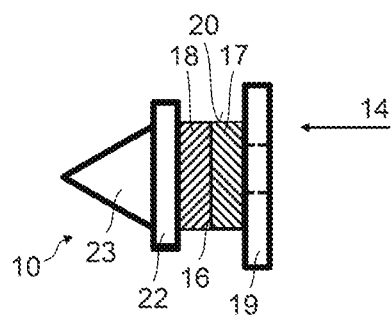
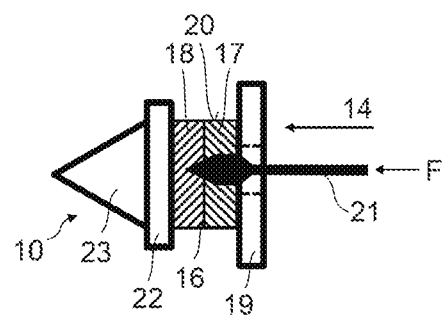
Fig. 3A            Fig. 3B
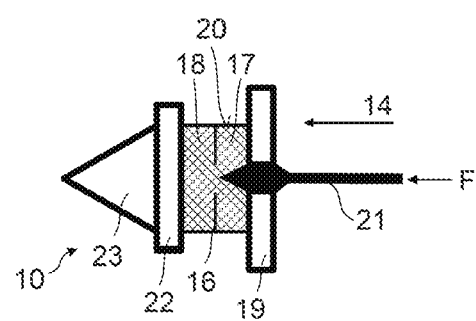
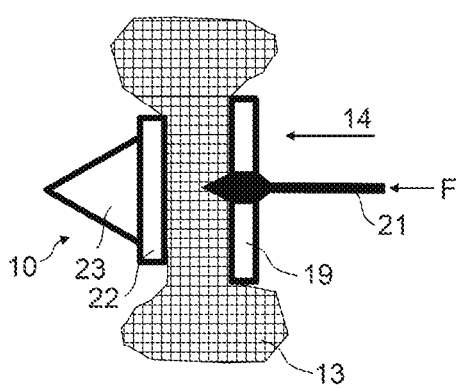
Fig. 3C            Fig. 3D Fig. 4A
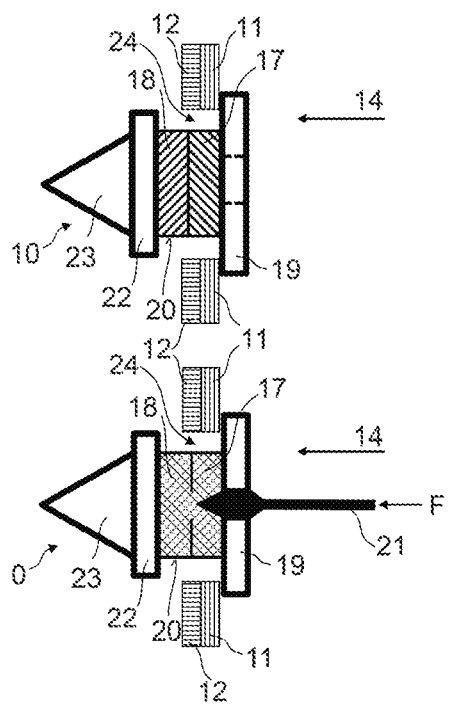
Fig. 4C
Fig. 4B
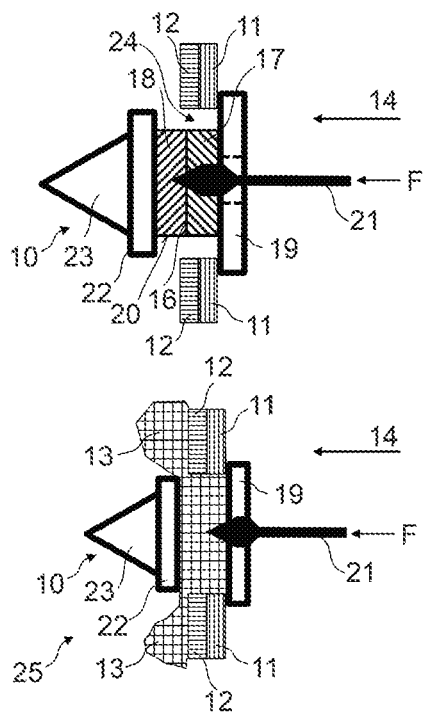
Fig. 4D

CONNECTING ELEMENT AND METHOD FOR PRODUCING A STRUCTURAL CONNECTION BETWEEN TWO STRUCTURAL PARTS BY FOAMABLE MATERIAL, AND ASSEMBLY COMPOSED OF TWO STRUCTURAL PARTS CONNECTED WITH A CONNECTING ELEMENT

CROSS-REFERENCE TO RELATED APPLICATIONS

This application claims priority to and the benefit of German Patent Application No. DE102020206061.4, filed on May 13, 2020. The disclosure of the above application is incorporated herein by reference.

FIELD

The present disclosure relates to a connecting element for producing a structural connection between two structural parts by and a method for producing the structural connection.

BACKGROUND

The statements in this section merely provide background information related to the present disclosure and may not constitute prior art.

In the automotive sector, structural parts, for example sheet metal parts of a vehicle structure, are adhesively bonded to one another using an adhesive with a predetermined strength. This bonding imparts the joined structural parts with sufficient stiffness, for example bending or torsional stiffness. Although adhesives with such properties are known, these are usually inadequate for forming a fluid-tight seal between the connected structural parts. A sealing operation is, therefore, often carried out in a separate step in order, for example, to prevent the ingress of air and/or water/moisture between the joined parts, to avoid corrosion, and/or to obtain improved NVH (Noise, Vibration, Harshness) properties of a vehicle.

In addition, it may be advantageous for structural parts to subsequently be provided (in part) with a structural reinforcement, for example a structural foam. For this purpose, the structural foam can be foamed into cavities of the structural parts. However, it can prove to be difficult to reach the desired points for introduction of the structural foam in a sufficiently satisfactory manner. By way of example, those regions of the structural parts which are to be reinforced may be accessible merely from a specific side.

German Patent No. DE 102011120518 A1 discloses a module element with a fuel filler neck for a motor vehicle arranged thereon. The module element is arranged on a side wall of the motor vehicle and has an expandable seal element on a side which faces the side wall. The module element is fastened to the side wall by a clip connection. After expansion, the seal element provides a fluid-tight connection between the module element and the side wall.

German Patent No. 102016203402 A1 describes an interior trim element for vehicles, wherein a foamable polymer is introduced between a rigid carrier and a top layer and subsequently foamed.

U.S. Pat. No. 7,520,560 B2 also discloses the adhesive bonding and sealing of two vehicle structural parts by introducing an expandable structural adhesive between two opposite joining surfaces of the structural parts.

SUMMARY

This section provides a general summary of the disclosure and is not a comprehensive disclosure of its full scope or all of its features.

A connecting element and a method for producing a structural connection between structural parts by foamable material are described in further detail below, said connecting element and method making it possible to join the structural parts, even at points which are difficult to access, in a simple manner and without a great assembly effort. The connection of the structural parts provides a sufficient strength/stiffness and sealing, in particular a fluid-tight sealing, of the joining points to be obtained in order to inhibit the ingress of water/moisture and/or air between the structural parts. Furthermore, corrosion is inhibited and the NVH (Noise, Vibration, Harshness) properties of the joined parts are improved. Further, the present disclosure also provides an assembly composed of two structural parts which are structurally connected with such a connecting element. The connection permits a high stiffness of the connected-together structural parts, having good NVH properties and also provides a high energy absorption capacity.

It should be noted that a conjunction "and/or" which is used herein and is situated between two features so as to link them should be interpreted to mean that it is possible in a first refinement of the subject matter according to the present disclosure for only the first feature to be present, in a second refinement for only the second feature to be present, and in a third refinement for both the first and the second feature to be present.

It is also understood to be the case that relative terms used herein in the context of the present disclosure relating to a feature, such as, for example, "larger," "smaller," "lower," "wider," "narrower," "thicker," "thinner," "softer," "harder," and the like, should always be interpreted to mean that production-related and/or implementation-related size deviations of the relevant feature which lie within the manufacturing/implementation tolerances defined for the respective manufacturing or implementation of the relevant feature are not encompassed by the respective relative term. In other words, according to this definition, a size of a feature is intended in the context of the present disclosure to be considered to be "larger," "smaller," "lower," "wider," "narrower," "thicker," "thinner," "softer," "harder," and the like, than a size of a comparable feature only when the two sizes compared differ from each other in terms of their value so significantly that this size difference does not safely fall within the manufacturing-related/implementation-related tolerance range of the relevant feature, but instead is the result of targeted action.

According to the present disclosure, a connecting element for producing a structural connection between a first and a second structural part by foamable material comprises a plug-in part. The plug-in part can be displaced along a plug-in direction and comprises at least two chambers separated from one another in a fluid-tight manner by a partition and which accommodate a reactant. A plug-in delimiting part is mechanically connected to the plug-in part and delimits the displacement of the plug-in part in the plug-in direction. The plug-in delimiting part protrudes radially, at least in part, outward beyond a circumferential surface of the plug-in part. A break-open mechanism is configured to damage the partition, as a result of a break-open force supplied to the break-open mechanism. In such a way, the fluid-tight separation between the at least two chambers is canceled, wherein the reactants of the respective chambers are selected such that the mixing thereof causes a foaming reaction, which extends radially outward beyond the circumferential surface of the plug-in part. In other words, the foaming reaction of the mixing reactants generates the foaming or foamed material which, owing to the size of its reaction volume and its reaction strength, extends at least partially outside the chambers. To this end, at least one of the chambers comprises one or more corresponding outlet openings and/or predetermined breaking points (purposefully provided material weakening for example of a chamber wall), which make it possible/make it easier for the foaming material to exit out of the chamber in the radial direction beyond the circumferential surface of the plug-in part.

The plug-in direction can, for example, be a direction parallel to a longitudinal axis of the plug-in part. The longitudinal axis can, for example, be an axis of symmetry of the plug-in part, wherein the plug-in part, with respect to its longitudinal axis, can be of rotationally symmetrical or at least axially symmetrical configuration.

The circumferential surface of the plug-in part or of the chambers of the plug-in part can be understood to mean a surface which runs around a longitudinal axis of the plug-in part.

"Breaking open" should be generally understood to mean forcibly opening something which is sealed, in particular the reactants which are accommodated/enclosed in a fluid-tight manner in their respective chambers. For example, "breaking open" may comprise cutting, piercing, squeezing, tearing, and the like.

The partition which separates the chambers from one another can be a substantially rigid wall. The partition can also be a substantially flexible membrane as long as the partition, in an intact state, provides a fluid-tight separation of the reactants accommodated in the chambers.

The structural parts can be sheet metal parts, plastics parts, composite parts composed of different materials, and the like. In particular, the structural parts can be parts of a vehicle structure, without however being restricted thereto. Generally speaking, the structural parts can be parts which provide an article comprising the structural parts with a load-bearing, force-absorbing, and force-transmitting structure. Particularly in vehicle construction, such structural parts can also be components which are relevant for a crash, that is to say components which provide a function as crash elements, for example for energy absorption.

A structural connection of two such structural parts may be a connection whose mechanical load-bearing capacity is equal to, or even exceeds, that of the individual structural components, such that the joined structural components can perform their function as crash elements as intended, for example in the case of a vehicle crash.

The connecting element according to the present disclosure makes it possible to connect two structural parts in a particularly simple manner, since said element is to be moved merely in its plug-in direction, for example is to be inserted from one side into a common plug-in opening of the structural components to be joined. In other words, even a considerably restricted accessibility of the structural components to be joined or of the connecting point, which is for example accessible from only one specific side, is sufficient for bringing (plugging) the connecting element into its intended position and subsequently activating the break-open mechanism by application of the desired break-open force to the break-open mechanism. It is possible for the force to be supplied from the same side from which the connecting element has been plugged, that is to say for example likewise substantially in the plug-in direction, without however being restricted thereto. The assembly effort of the connecting element for connecting the structural parts is thus extremely low.

Depending on the specific selection of the reactants, a desired strength/stiffness/elasticity of the structural connection is produced after the foaming of the final material which forms from the reactants, for example a foamed polymer, a foamed structural adhesive, and the like, by chemical reaction of the mixing reactants with subsequent curing. The foaming reaction can take place at a largely inaccessible point of the structural parts to be joined, without further manual/mechanical intervention in inaccessible regions of the structural parts. The foamed material which results from the mixing of the reactants is also able to provide sealing, in particular a fluid-tight sealing, of the joining points, such that the ingress of water/moisture and/or air between the structural parts is inhibited. This makes it possible to inhibit corrosion. The NVH (Noise, Vibration, Harshness) properties of the joined parts can likewise be improved, since the foamed material can damp or inhibit vibrations, and thus the generation of noise.

According to one variation of the present disclosure, the chambers are outwardly delimited by a respective circumferential wall, wherein the circumferential wall of one of the chambers has a lower wall thickness than a wall thickness of the circumferential wall of the other chamber, and/or the circumferential wall of at least one of the chambers has a predetermined breaking point, for example in the form of a purposefully provided material weakening. Since that volume of the foamed material which forms as a result of the foaming reaction of the reactants is greater than the volume enclosed by the chambers, the foaming material breaks through the circumferential wall with the lower wall thickness and/or the circumferential wall with the predetermined breaking point first. In this way, targeted directing/guiding of the outflow direction of the foaming material is achieved during the foaming reaction. The foamed material can thus be arranged in the regions which are to be reached/to be filled with particular preference (for example an inaccessible rear side of the structural parts to be joined) without further manual or mechanical intervention. Accordingly, it is possible to provide a structural connection having the desired properties (for example strength, stiffness/elasticity, NVH, etc.).

According to a further variation of the present disclosure, the break-open mechanism comprises a piercing needle which pierces the partition between the chambers. The piercing needle comprises a break-open mechanism of particularly simple construction, since already a simple longitudinal displacement of the piercing needle, said displacement being brought about by the supplied break-open force, can cancel the initially fluid-tight separation of the chambers in a targeted manner by perforation of the partition, such that the reactants can consequently mix and form a chemical reaction. In one form of the present disclosure, the longitudinal displacement direction of the piercing needle substantially corresponds to the plug-in direction of the plug-in part, such that both plugging-in of the connecting element and activation of the break-open mechanism to use and insert the connecting element is achieved using one assembly direction.

According to another variation of the present disclosure, the piercing needle extends through one of the chambers to outside of the chamber and can be mounted thereon in a fluid-tight and longitudinally displaceable manner. As a result, uncontrolled leakage of the foaming material at the bearing point of the piercing needle is inhibited, such that foaming material can be directed in a targeted manner into the desired regions during the foaming reaction. Contamination on the actuating side of the piercing needle is also inhibited by the foaming material.

The fluid-tight mounting of the piercing needle on the chamber can be achieved, for example, by a (for example cylindrical) needle shaft mounted in a correspondingly tight guide on a chamber wall. In one form of the present disclosure, a needle head is configured such that said needle head, after the perforation of the partition, in a completely withdrawn/pulled-out state of the piercing needle, bears against a chamber wall in a fluid-tight manner. By way of example, such a needle head can be of conical/tapered form in the direction of the partition and of disk-shaped/flat form in the direction of the chamber wall which mounts the piercing needle in a longitudinally displaceable manner.

According to a yet further variation of the present disclosure, the plug-in part comprises, at an end spaced apart from the plug-in delimiting part in the plug-in direction, a collar protruding radially, at least in part, outward beyond the circumferential surface of the plug-in part. On the one hand, the collar assists the targeted directing of the flow direction of the foaming material, for example in the radial direction away from the plug-in part, during the foaming reaction. On the other hand, after the curing of the foamed material, the collar can also be used as an additional abutment against a displacement of the connecting element counter to the plug-in direction in that the collar is supported on the cured, foamed material.

Still another variation of the present disclosure provides the plug-in part of conical configuration at an end spaced apart from the plug-in delimiting part in the plug-in direction. The tapering end of the conical end may be oriented in the plug-in direction, such that, for assembly purposes, the connecting element can be introduced more easily into a plug-in opening.

According to an additional variation of the present disclosure, the plug-in part is pin-shaped with a round cross section (for example circular/elliptical) or with an angular cross section (that is to say polygonal, for example triangular, rectangular, square, pentagonal, etc.). In this way, the connecting element can be adapted to a multiplicity of possible plug-in openings. In particular, when the plug-in part has a non-rotationally symmetrical cross section, the connecting element can also be introduced into a plug-in opening in a captive manner and held there.

According to still a further variation of the present disclosure, the plug-in part and/or the plug-in delimiting part and/or the break-open mechanism are formed from a polymeric material. The whole connecting element can be produced from a polymeric material, without however being restricted thereto. The different constituent parts of the connecting element can also be produced from a metallic material or from a combination of the two aforementioned materials.

According to a further variation of the present disclosure, an assembly comprises a first and a second structural part, said first and second parts being structurally connected with a connecting element according to one of the variations of the present disclosure described above. The structural parts each comprise a plug-in opening, such openings being arranged above one another in a substantially congruent manner and into which the connecting element is plugged. The plug-in delimiting part bears against one of the structural parts, and the foamed material, which is formed as a result of the foaming reaction of the reactants after activation of the break-open mechanism, extends radially outward beyond the circumferential surface of the plug-in part and bears against the other structural part.

In respect of definitions of terms relating to the assembly and of the effects and advantages of features relating to the assembly, reference is comprehensively made to the disclosure of corresponding definitions, effects and advantages herein with respect to the connecting element according to the present disclosure. In other words, disclosures herein with respect to the connecting element according to the present disclosure are likewise intended to be correspondingly applicable for the definition of the assembly according to the present disclosure, unless this is expressly excluded. Disclosures herein with respect to the assembly according to the present disclosure are likewise intended to be correspondingly applicable for the definition of the connecting element according to the present disclosure, unless this is expressly excluded. In this respect, a repetition of explanations of features which are analogous, or their effects and advantages, in respect of the connecting element according to the present disclosure disclosed herein and in respect of the assembly according to the present disclosure disclosed herein can be dispensed with for the sake of a more concise description, without such omissions being interpreted as a limitation.

According to still another variation of the present disclosure, a method for producing a structural connection between a first and a second structural part by foamable material using a connecting element according to one of the variations of the present disclosure described above, comprises: arranging the first and second structural parts with a respective plug-in opening such that the respective plug-in openings lie above one another in a congruent manner; plugging the plug-in part, in the plug-in direction, into the plug-in openings of the first and second structural parts until the plug-in delimiting part bears against one of the structural parts; supplying the break-open force to the break-open mechanism of the connecting element to damage the partition between the chambers such that the fluid-tight separation between the chambers containing the respective reactants is canceled and the foaming reaction of the reactants which mix as a result is brought about; and directing the foaming material, which forms as a result of the foaming reaction, radially outward beyond the circumferential surface of the plug-in part and against the other structural part, that is to say against the structural part which does not bear (possibly directly) against the plug-in delimiting part.

The structural parts are thus inserted between the plug-in delimiting part which bears against one of the structural parts and the foamed material which bears against the other structural part. Said structural parts can be compressed in this sandwich arrangement.

It should once again be noted that, in respect of definitions of terms relating to the method and of effects and advantages of features relating to the method, reference is comprehensively made to the disclosure of corresponding definitions, effects and advantages herein with respect to the connecting element according to the present disclosure, such that disclosures herein with respect to the connecting element according to the present disclosure are likewise correspondingly applicable for the definition of the method according to the present disclosure, unless this is expressly excluded. Disclosures herein with respect to the method according to the present disclosure are likewise intended to be correspondingly applicable for the definition of the connecting element according to the present disclosure, unless this is expressly excluded. Thus, a repetition of explanations of features which are analogous, or their effects and advantages, in respect of the connecting element according to the present disclosure disclosed herein and in respect of the method according to the present disclosure disclosed herein can be dispensed with for the sake of a more concise description, without such omissions being interpreted as a limitation.

Further areas of applicability will become apparent from the description provided herein. It should be understood that the description and specific examples are intended for purposes of illustration only and are not intended to limit the scope of the present disclosure.

DRAWINGS

Further features and advantages of the disclosure emerge from the following description of an exemplary embodiment of the disclosure, said exemplary embodiment being understood as non-restrictive and being explained in more detail below with reference to the drawing. In this drawing, in each case schematically:

FIGS. 3A to 3D illustrate alternative stages of the function of the connecting element from FIG. 2 of the present disclosure;

FIGS. 4A to 4D illustrate alternative stages of the function of the connecting element from FIG. 2 of the present disclosure for the production of a connection between two structural parts.

Figure 1:
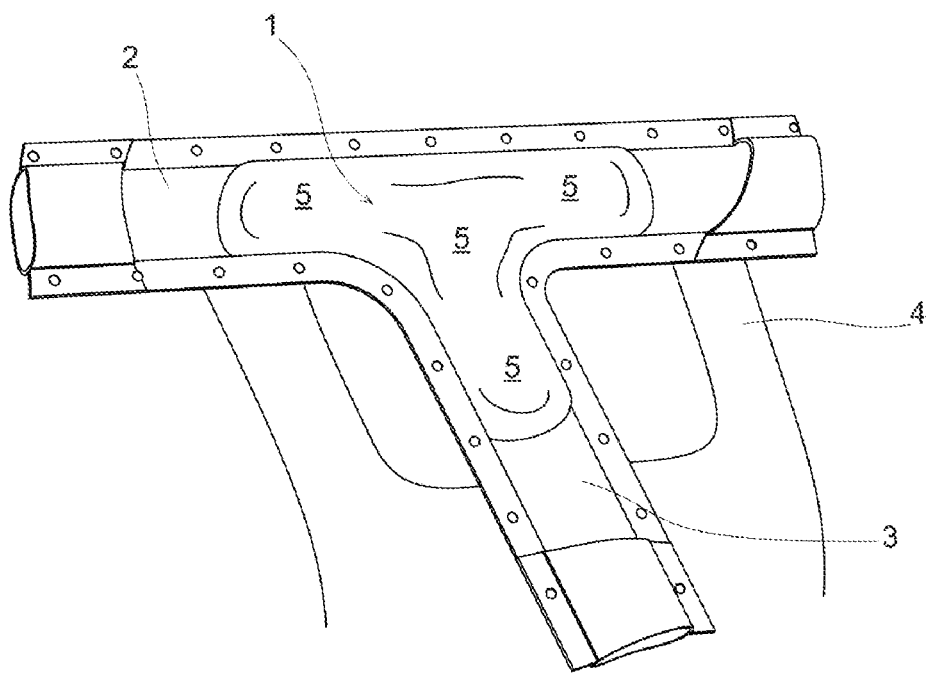
FIG. 1 illustrates a perspective, partially sectioned view of a joining/reinforcing region of structural parts of a vehicle structure foamable material according to one variation of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the different figures, parts of equivalent function are always provided with the same reference designations, and so said parts are generally also described only once.

FIG. 1 illustrates a perspective, partially sectioned view of an exemplary joining/reinforcing region 1 of structural parts 2 (for example roof beam) and 3 (for example B pillar) of a vehicle structure 4 of a motor vehicle (not illustrated in any more detail) with a foamed material 5 (for example foamed polymer, foamed adhesive/structural adhesive). The foamed material 5 can be seen in FIG. 1 since the front side of the structural parts 2, 3 has been cut away in the illustration of FIG. 1. In the example shown, it is understood that the foamed material 5 has been introduced into a substantially closed cavity of the structural parts 2, 3. This cavity is accessible merely from an outer side of the structural parts 2, 3.

The structural connection and/or structural reinforcement between the structural parts 2, 3, which is/are illustrated in FIG. 1 and is/are produced by the foamed material 5, has/have a mechanical load-bearing capacity which is equal to, or exceeds, that of the individual structural parts 2, 3. The joined/reinforced structural parts 2, 3 can thus perform their function as crash elements in the event of a crash of the vehicle (not illustrated in any more detail).

The present disclosure is not restricted to the use in the field of application (vehicle assembly) illustrated in FIG. 1, although said field of application is particularly desirable on account of its involvement of structural parts which are to be joined and/or reinforced often under very confined assembly conditions and which have particular requirements in terms of their crash properties/crash resistance.

Figure 2:
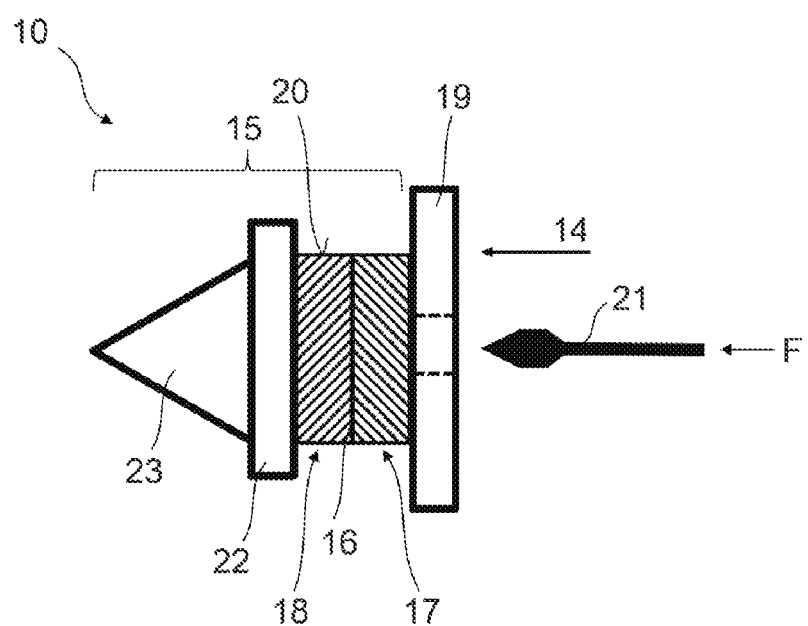
FIG. 2 illustrates a side view of a connecting element according to one variation of the present disclosure.

FIG. 2 schematically illustrates a side view of an exemplary variation of a connecting element 10 according to the present disclosure. The connecting element 10 produces a structural connection between a first and a second structural part 11, 12 (see FIG. 4) by a foamable material 13 (see FIGS. 3 and 4).

As can be seen from FIG. 2, the connecting element 10 has a plug-in part 15 (of pin-shaped form, as shown) which can be displaced along a plug-in direction 14. The plug-in part 15 has, in the plug-in direction 14, two chambers 17 and 18 separated from one another in a fluid-tight manner by a partition 16. A respective reactant is accommodated in each chamber 17, 18, said reactant, when mixed with the reactant accommodated in the adjacent chamber, causing a foaming reaction as a result of a chemical reaction, from which the foamed material 13 (FIGS. 3, 4) arises.

Furthermore, a plug-in delimiting part 19 which is mechanically connected to the plug-in part 15 and which delimits the displacement of the plug-in part 15 in the plug-in direction 14 can be seen in FIG. 2. As shown in FIG. 2, the plug-in delimiting part 19 protrudes radially (around the full circumference, as shown) outward beyond a circumferential surface 20 of the plug-in part 15.

Furthermore, the connecting element 10 has a break-open mechanism 21 (in the form of a piercing needle, as shown) configured to damage the partition 16 as a result of a break-open force F supplied to the break-open mechanism 21. Here, the partition 16 is damaged such that the fluid-tight separation between the chambers 17, 18 is canceled and the reactants accommodated in the chambers 17, 18 mix with one another. This causes the foaming reaction which extends radially outward beyond the circumferential surface 20 of the plug-in part 15, as will be explained in more detail below.

As has already been mentioned, the break-open mechanism 21 of the exemplary variation of the present disclosure shown has a piercing needle, however the present disclosure is not restricted thereto. The partition 16 between the chambers 17, 18 can be pierced with the piercing needle 21.

It can further be seen from FIG. 2 that the plug-in part 15 has, at an end which is spaced apart from the plug-in delimiting part 19 in the plug-in direction 14, a collar 22 protruding radially outward beyond the circumferential surface 20 of the plug-in part 15. Furthermore, the plug-in part 15, at the end which is spaced apart from the plug-in delimiting part 19 in the plug-in direction 14, is additionally of conical configuration and has a conical end 23 whose tapering is oriented in the plug-in direction 14.

Overall, the plug-in part 15 can be pin-shaped with a round or angular cross section. Furthermore, the plug-in part 15, and/or the plug-in delimiting part 19, and/or the break-open mechanism 21, and/or the collar 22, and/or the conical end 23 can be formed from a polymeric material, a metal, or from a combination thereof.

FIGS. 3A to 3D illustrate the functioning of the connecting element 10 according to FIG. 2 in more detail. FIG. 3A illustrates substantially the connecting element 10 as in FIG. 2 (but without a break-open mechanism 21). It can be seen in FIG. 3B that the piercing needle 21 extends through the first chamber 17. The piercing needle is mounted on the chamber 17 in a fluid-tight and longitudinally displaceable manner (in the same direction as the plug-in direction 14, as shown). The piercing needle 21 also extends outside of the first chamber 17, such that the break-open force F can be exerted on said piercing needle from the outside. In the present disclosure, the break-open force F acts in the same direction as the plug-in direction 14, however the present disclosure is not restricted thereto. In FIG. 3B, the piercing needle 21 has already penetrated through the partition 16 as a result of the action of the break-open force F and has damaged (perforated) said partition, as indicated by an opening in the partition 16 in FIG. 3C. The damaging of the partition 16 provides for the reactants contained in the chambers 17 and 18 to mix and cause the foaming reaction in a chemical reaction. The volume expansion and reaction strength of the foaming reaction of the mixing reactants are determined such that the foaming material 13 extends radially outward beyond the circumferential surface 20 of the plug-in part 15. In order to facilitate this expansion of the foaming material 13, the chambers 17, 18 can be outwardly delimited by a respective circumferential wall (corresponding to the circumferential surface 20), wherein the circumferential wall of one of the chambers 17 or 18 has a lower wall thickness than a wall thickness of the circumferential wall of the other chamber 18 or 17, and/or the circumferential wall of at least one of the chambers 17, 18 has a predetermined breaking point (not shown).

Figure 5:
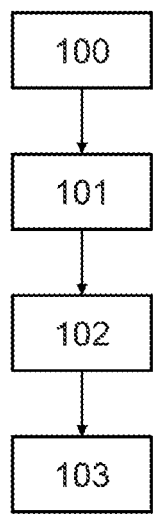
FIG. 5 is a flow diagram of one variation of a method for producing a structural connection between structural parts by foamable material according to the present disclosure.

FIGS. 4A to 4D illustrate the functioning of the connecting element 10 according to FIG. 2 of the present disclosure for the production of a connection between the two structural parts 11 and 12 in more detail. FIGS. 4A to 4D are described in conjunction with FIG. 5, which illustrates a flow diagram of an exemplary variation of a method for producing a structural connection between the structural parts 11 and 12 by the foamable material 13 according to the present disclosure using the connecting element 10.

In a first step 100, the first and the second structural part 11, 12 are arranged with a respective plug-in opening 24 such that the respective plug-in openings 24 lie above one another in a congruent manner, as illustrated in FIG. 4A. In step 101, the plug-in part 15 of the connecting element 10 is then plugged, in the plug-in direction 14, into the plug-in openings 24 of the first and second structural parts 11, 12 until the plug-in delimiting part 19 bears against one of the structural parts (against the first structural part 11, as shown), as can likewise be seen in FIG. 4A. In step 102, the break-open force F is then supplied to the break-open mechanism (to the piercing needle 21, as shown) of the connecting element 10 to damage the partition 16 between the chambers 17, 18 (FIG. 4B) such that the fluid-tight separation between the chambers 17, 18 containing the respective reactants is canceled (FIG. 4C) and the foaming reaction of the reactants which mix as a result is brought about, in order to finally form the foamed material 13 (FIG. 4D). In step 103, the foaming material 13, which forms as a result of the foaming reaction, is directed radially outward beyond the circumferential surface 20 of the plug-in part 15 and against the other one of the two structural parts (against the second structural part 12, as shown), as can be readily seen in FIG. 4D. The collar 22 additionally supports this directing action of the flow direction during the foaming reaction. After the curing of the foamed material 13, the two structural parts 11 and 12 are compressed between the plug-in delimiting part 19 and the foamed material 13. The foamed material 13 produces both the structurally stable connection and a sealing between the structural parts 11 and 12. In order to produce this structural connection, the connecting element 10 is assembled in the plug-in direction 14 from the side of the first structural part 11. The free side of the second structural part 12 can be substantially completely inaccessible for manual and/or mechanical machining operations. The accessibility of the structural parts 11, 12 may thus be considerably restricted, and the structural parts 11, 12 can nevertheless be structurally connected/reinforced with the connecting element 10 according to the present disclosure.

FIG. 4D also illustrates an example of an assembly 25 according to the present disclosure. The assembly 25 comprises the first and second structural parts 11 and 12, and also the connecting element 10 which connects the structural elements 11, 12 to one another and/or seals the connection of said structural elements 11, 12. As already described above, the structural parts 11, 12 each have a plug-in opening 24, which are arranged above one another in a congruent manner. The connecting element 10 is plugged into the plug-in openings 24. Here, the plug-in delimiting part 19 bears against one of the structural parts (against the first structural part 11, as shown). The foamed material 13, which is formed as a result of the foaming reaction of the reactants of the chambers 17 and 18 after the partition 16 has been damaged by the break-open mechanism (the piercing needle 21, as shown), extends radially outward beyond the circumferential surface 20 of the plug-in part 15 and bears against the other structural part (against the second structural part 12, as shown).

The connecting element according to the present disclosure disclosed herein, the connection method according to the present disclosure disclosed herein, and the disclosed assembly composed of two structural parts and a connecting element according to the present disclosure are not restricted to the variations disclosed herein but also encompass similarly acting further variations that result from technically expedient further combinations of the features described herein, both of the method and of the connecting element, and also of the assembly. In particular, the features and feature combinations mentioned above in the general description and in the description of the figures of the present disclosure and/or shown in the figures alone may be used not only in the respectively indicated combinations but also in other combinations or individually without departing from the scope of the present disclosure.

In a still further variation of the present disclosure, both the connection method according to the present disclosure and the connecting element according to the present disclosure are used for joining structural parts of a vehicle, for example structural parts of a vehicle structure. However, the present disclosure is not restricted thereto. The assembly according to the present disclosure composed of two structural parts which are connected with such a connecting element may be used in vehicle construction, without however being restricted to this field of application.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A connecting element for producing a structural connection between a first structural part and a second structural part by a foamable material, the connecting element comprising:
    a plug-in part displaced along a plug-in direction and comprising at least two chambers separated from one another in a fluid-tight manner by a partition, each of the at least two chambers accommodating a reactant;
    a plug-in delimiting part mechanically connected to the plug-in part and configured to delimit displacement of the plug-in part in the plug-in direction, the plug-in delimiting part protruding radially, at least in part, outward beyond a circumferential surface of the plug-in part; and
    a break-open mechanism configured to damage the partition, as a result of a break-open force supplied to the break-open mechanism, such that the fluid-tight manner between the at least two chambers is canceled,
    wherein reactants of the respective chambers are selected such that mixing thereof causes a foaming reaction, which extends radially outward beyond the circumferential surface of the plug-in part.

2. The connecting element according to claim 1, wherein the break-open mechanism comprises a piercing needle with which the partition between the chambers is pierced.

3. The connecting element according to claim 2, wherein the piercing needle extends through one of the chambers to an outside of said chamber and is configured to be mounted thereon in a fluid-tight and longitudinally displaceable manner.

4. The connecting element according to claim 1, wherein the chambers are outwardly delimited by a respective circumferential wall, wherein the circumferential wall of one of the chambers has a lower wall thickness than a wall thickness of the circumferential wall of the other chamber, and/or the circumferential wall of at least one of the chambers has a predetermined breaking point.

5. The connecting element according to claim 4, wherein the break-open mechanism comprises a piercing needle with which the partition between the chambers is pierced.

6. The connecting element according to claim 5, wherein the piercing needle extends through one of the chambers to an outside of said chamber and is configured to be mounted thereon in a fluid-tight and longitudinally displaceable manner.

7. The connecting element according to claim 1, wherein the plug-in part comprises, at an end which is spaced apart from the plug-in delimiting part in the plug-in direction, a collar which protrudes radially, at least in part, outward beyond the circumferential surface of the plug-in part.

8. The connecting element according to claim 1, wherein the plug-in part has a conical configuration at an end which is spaced apart from the plug-in delimiting part in the plug-in direction.

9. The connecting element according to claim 1, wherein the plug-in part is pin-shaped with a round cross section.

10. The connecting element according to claim 1, wherein the plug-in part is pin-shaped with an angular cross section.

11. The connecting element according to claim 1, wherein the plug-in part is formed from a polymeric material.

12. The connecting element according to claim 1, wherein the plug-in delimiting part is formed from a polymeric material.

13. The connecting element according to claim 1, wherein the break-open mechanism is formed from a polymeric material.

14. The connecting element according to claim 1, wherein the plug-in direction comprises a direction parallel to a longitudinal axis of the plug-in part.

15. The connecting element according to claim 1, wherein the partition comprises a rigid wall.

16. The connecting element according to claim 1, wherein the partition comprises a flexible membrane.

17. A method for producing a structural connection between a first structural part and a second structural part by a foamable material using the connecting element according to claim 1, the method comprising:
    arranging the first and second structural parts such that a respective plug-in opening in each structural part is aligned;
    plugging the plug-in part, in the plug-in direction, into the plug-in openings of the first and second structural parts until the plug-in delimiting part bears against one of the structural parts;
    supplying the break-open force to the break-open mechanism of the connecting element to damage the partition between the chambers such that the fluid-tight manner between the chambers containing the respective reactants is canceled, the reactants mix, and the foaming reaction of the reactants is brought about; and
    directing foaming material, which forms as a result of the foaming reaction, radially outward beyond the circumferential surface of the plug-in part and against the structural parts.

18. The method according to claim 17, wherein the plug-in part is formed from a polymeric material.

19. The method according to claim 17, wherein the plug-in delimiting part is formed from a polymeric material.

* * * * *